E. O. SCHWEITZER.
APPARATUS FOR TESTING CABLES.
APPLICATION FILED FEB. 1, 1912. RENEWED JULY 14, 1917.

1,262,103.

Patented Apr. 9, 1918.

Inventor
Edmund O. Schweitzer

UNITED STATES PATENT OFFICE.

EDMUND O. SCHWEITZER, OF CHICAGO, ILLINOIS.

APPARATUS FOR TESTING CABLES.

1,262,103.　　　　　Specification of Letters Patent.　　Patented Apr. 9, 1918.

Application filed February 1, 1912, Serial No. 674,696. Renewed July 14, 1917. Serial No. 180,679.

*To all whom it may concern:*

Be it known that I, EDMUND O. SCHWEITZER, a citizen of the United States, residing at Chicago, in the county of Cook and State of Illinois, have invented a certain new and useful Improvement in Apparatus for Testing Cables, of which the following is a full, clear, concise, and exact description, reference being had to the accompanying drawings, forming a part of this specification.

My invention relates to an apparatus for testing cables, and has as its principal object the discovery of a fault or ground in the cable in a much more simple and expeditious manner than has been hitherto known.

A further object of my invention resides in the particular arrangement and combination of parts hereinafter described.

Figure 1:
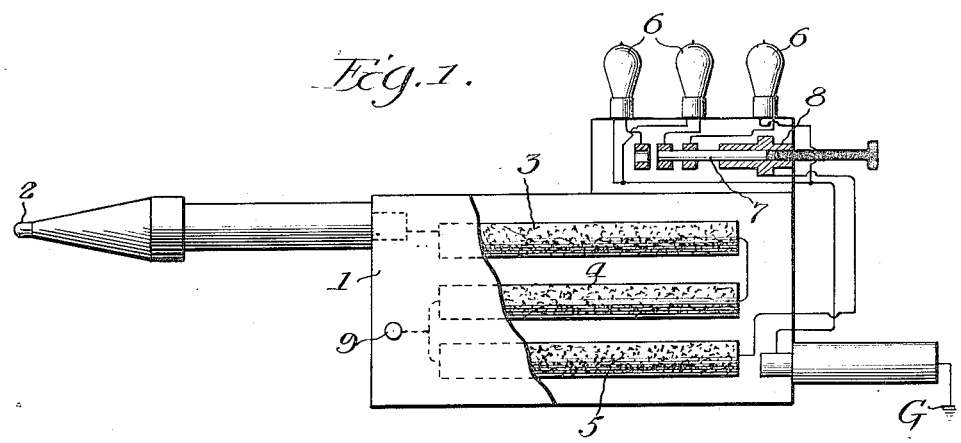
Figure 2:
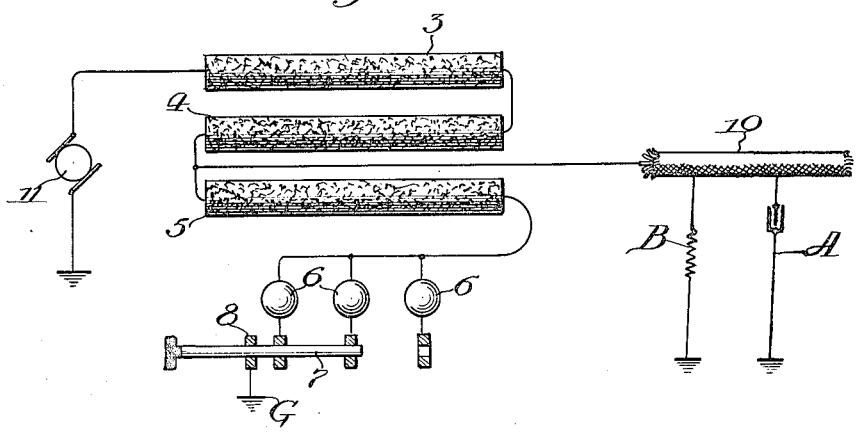

In the accompanying drawing, Figure 1 is an elevational view of my apparatus, part being broken away; Fig. 2 is a diagrammatic view illustrating my device as connected up for use. The same part is designated by the same reference numeral in the separate views.

Referring more particularly to the drawing, 1 represents the case of my improved apparatus which is provided with a metallic tip or contact 2 designed to make connection with a source of electricity. Tip 2 is in electrical connection, as shown in dotted lines in Fig. 1, with a series of resistance rods 3, 4, and 5, preferably of about 5500 ohms each. These rods are in series with a set of lamps 6, which lamps are connected in parallel with each other and controlled by a switch 7, so that one or more of the lamps may be included in the circuit as desired. It will be understood that the number of lamps placed in circuit will depend upon the voltage of the supply circuit to which the device is connected. Switch 7 is provided with a socket piece 8 which is connected to a ground contact, as indicated at G. Intermediate between the rods 4 and 5, a binding post or contact 9 is connected.

As will be seen by comparison with my Patent No. 1,043,150, issued November 5, 1912, for a potential indicating and measuring device, the apparatus described above differs from one of the forms in the said patent by the addition of a contact or binding post 9.

In using my apparatus to determine whether or not a cable is in good condition, I first connect the cable to the terminal G and the tip 2 to a suitable source of electricity, say of a pressure of 2300 volts alternating. If the lamps fail to light, the cable is in good condition, since any leak or fault would cause a flow through the fault in the cable and the ground and return to the source of supply. It often happens, though, that a cable under test possesses sufficient capacity so that its sheathings act as a condenser to allow an alternating current to pass to the ground, completing the circuit and allowing enough current to flow to light one or more of the lamps. This may occur, of course, whether the cable is faulty or not.

In order to distinguish between the current due to a fault and that due to the capacity of the cable, I disconnect the cable from the terminal G and connect to the post 9, the terminal G being connected to the ground. The complete electric diagram is then illustrated in Fig. 2, wherein 10 designates the cable and 11 an alternator having a grounded terminal, the circuit A between the cable and ground being that representing the capacity of the cable while the circuit B represents any possible fault that may exist. If the lights continue to burn after making the connection shown in Fig. 2, the cable is known to be in good order, whereas if the lights go out it is shown that the cable is grounded. It will be seen that when connected as in Fig. 2 the resistance rod 5 acts as a protection to the lamps 6 against a high voltage which might destroy them.

The above results follow from the following considerations: We assume a 4000 volt cable 7 miles long. Such a cable has a capacity of about 1 microfarad, and consequently a reactance of about 2600 ohms on 60 cycle current. If we assume then that the cable has a fault which possesses a resistance of 1000 orms to the ground, the fault and the capacity of the cable form two parallel circuits to ground, as indicated in Fig. 2 at A and B. The joint impedance of these two circuits to ground may be computed according to the usual rules for determining the impedance of a resistance and a capacity in parallel, giving a combined impedance of approximately 930 ohms. This calculation stated more in detail is as follows. Assume a test voltage of 2300, Susceptance of condenser $\frac{1}{2600} = .000385$ mhos Conductance of fault $\frac{1}{1000} = .001$ mhos Admittance fault + condenser $$\sqrt{g^2+b^2} = \sqrt{(.000385)^2 + (.001)^2}$$
$$= \sqrt{.000,000,15 + .000,001} = \sqrt{.00000115}$$
$$= .001070 \text{ mho.}$$

The impedance $= \frac{1}{.001070} = 930$ ohms.

Hence the equivalent series resistance $= \frac{.001}{.00107} \times 930 = 870$ ohms.

Hence the equivalent series reactance $= \frac{.000385}{.00107} \times 930 = 335$ ohms.

Hence the total resistance $= 11000 + 870 = 11870$ ohms and the total impedance $= \sqrt{(11900)^2 + (335)^2}$
$$= \sqrt{142,000,000 + 110,000} = 12000 \text{ O.}$$

Hence the current through the circuit including resistance rods 3, 4 and the cable $= \frac{2300}{12000}$ amps., and the potential across the lamp circuit $= \frac{2300}{12000} \times 930 = 178$ volts which is not sufficient to light the lamps on account of the resistance rod 5 in the lamp circuit.

It will be understood, however, that the lamps used in my device are operated by a small current so that a slight ground in the cable would be indicated even when all the resistance of the device is in series, as in the first connection described.

It can be shown in a similar manner that in case the same cable used as a basis for the above computation were ungrounded the voltage across the lamp circuit would rise to 530, which would be sufficient to give an indication showing that the cable was sound.

It can be further shown that on cables of shorter length or less capacity, the difference between the voltage of the lamp circuit when the cable was grounded, and ungrounded, is more distinctly marked than in the case just considered. In other words, if one microfarad is the maximum capacity of the cable under test, the potential from a sound cable to the ground when connected as in Fig. 2 will always be greater than 530 volts if the other factors assumed in the calculations remain the same.

Having thus described my invention, what I claim as new and desire to secure by Letters Patent is:

1. A portable testing instrument comprising a portable case, a metallic tip mounted upon said case and other instrumentalities also carried by said case as follows to-wit: a series of high resistance carbon rods connected in series with one another and with said metallic tip, a terminal for outside connection connected with said graphite rods between two of the same, a set of lamps connected at the end of said graphite rods farthest from the end connected with said metallic tip, said lamps being combined with means whereby one or more of them may be included in the circuit, and a ground terminal connected with said lamps.

2. In a device of the class specified, the combination with a conductor of a circuit connected therewith, current limiting means in said circuit in series with the conductor, means to impress an alternating voltage on said circuit, and means to indicate the relation between the resulting charging and faults or leakage currents developed in said circuit, thereby to determine the presence or absence of a fault in said conductor.

3. In a device of the class specified, the combination with a conductor of a circuit connected therewith, an impedance in said circuit in series with the conductor, means to impress an alternating voltage on said circuit, and means to indicate the relation between the resulting charging and faults or leakage currents developed in said circuit, thereby to determine the presence or absence of a fault in said conductor.

4. In a device for testing for faults in a dielectric separating two conducting elements, the combination with a circuit connected to said elements, an impedance in said circuit, means to impress an alternating voltage on said circuit, and means to indicate the relation between the resulting charging and fault or leakage currents developed in said conducting elements whereby to determine the presence or absence of a fault in said dielectric.

In witness whereof, I hereunto subscribe my name this 30th day of January, A. D. 1912.

EDMUND O. SCHWEITZER.

Witnesses:
 A. L. JONES,
 A. S. DENNISON.